United States Patent [19]

Burn

[11] 4,308,570
[45] Dec. 29, 1981

[54] HIGH Q MONOLITHIC CAPACITOR WITH GLASS-MAGNESIUM TITANATE BODY

[75] Inventor: Ian Burn, Williamstown, Mass.
[73] Assignee: Sprague Electric Company, North Adams, Mass.
[21] Appl. No.: 124,388
[22] Filed: Feb. 25, 1980
[51] Int. Cl.³ .............................................. H01G 4/12
[52] U.S. Cl. .................................. 361/320; 106/39.8; 106/73.3; 501/10; 501/136
[58] Field of Search ...................... 361/320, 321, 322; 106/73.3, 39.8; 252/520, 521, 63.5

[56] References Cited

U.S. PATENT DOCUMENTS

| | | | |
|---|---|---|---|
| 2,305,327 | 12/1942 | Thurnauer | 106/73.3 |
| 2,436,840 | 3/1948 | Wainer | 106/73.3 |
| 2,689,185 | 9/1954 | Soyck | 106/73.3 |
| 2,741,561 | 4/1956 | Das Gupta | 106/73.3 |
| 2,883,290 | 4/1959 | Planer et al. | 361/321 X |
| 4,071,881 | 1/1978 | Bacher | 361/320 |
| 4,101,952 | 7/1978 | Burn | 361/320 X |

FOREIGN PATENT DOCUMENTS 51-698  1/1976 Japan ................................ 106/73.3

OTHER PUBLICATIONS

Kudrenko et al., "Effect of Preparation Procedure on the Properties of Magnesium Titanates", *Izvestiya Akad. Nauk, Neorganicheskie Materialy*, vol. 12, No. 4, pp. 679–683, Apr. 1976.

*Primary Examiner*—Elliot A. Goldberg
*Attorney, Agent, or Firm*—Connolly and Hutz

[57] ABSTRACT

Monolithic capacitors having Q's of 3500 include copper electrodes buried in a non-reducible body that consists of a crystalline magnesium titanate phase and an intergranular glass phase. The crystalline phase contains magnesium meta-titanate and/or ortho-titanate. Magnesium di-titanate is excluded from the body as are the oxides of lead, bismuth and cadmium, which materials are reducible at the firing conditions necessary to preserve the integrity of the copper electrodes.

6 Claims, 2 Drawing Figures

HIGH Q MONOLITHIC CAPACITOR WITH GLASS-MAGNESIUM TITANATE BODY

BACKGROUND OF THE INVENTION

This invention relates to glass-ceramic capacitors having buried base-metal electrodes and more particularly to such a capacitor having a reduction resistant high Q glass-magnesium titanate body with copper electrodes.

Magnesium titanate has been used as a capacitor dielectric providing a low dielectric constant (K), a low or smooth temperature coefficient of capacity (TCC) and a high quality factor (Q). The Q of a capacitor is defined as the ratio of capacitive reactance to equivalent series resistance at the frequency of measurement.

It is also known to combine a magnesium titanate powder in a glass and provide copper containing electrodes to form cross-overs in a multilayer printed circuit or a capacitor on an alumina substrate. However, no more than 25 weight percent magnesium titanate is prescribed for use in the glass-ceramic body and at least 75% glass is employed toward matching the thermal coefficient of expansion of the alumina substrate, and these materials provide 1 MHz values of Q in the range of 400 to about 800.

It is an object of the present invention to provide a low cost monolithic capacitor including a low firing magnesium titanate body exhibiting a high Q at 1 MHz.

SUMMARY OF THE INVENTION

A monolithic ceramic capacitor includes a non-reducible glass-ceramic body having buried therein at least one copper electrode. The body consists of from 10 to 50% by weight of a non-reducible glass phase and from 50 to 90% by weight of a non-reducible crystalline ceramic phase that includes at least 85 mole percent magnesium titanate. The dielectric constant at room temperature is low, namely from 5 to 25 or about 10, and the capacitor has a near zero temperature coefficient of capacity (TCC). At 1 MHz the Q of the capacitor is greater than 1000.

This invention recognizes the principle that the properties of both the glass and the ceramic phases must be non-reducible at the firing conditions necessary to prevent melting and to prevent oxidation of the buried copper electrode(s), namely a firing temperature of about 1050° C. in an environment of about $10^{-11}$ atmospheres of oxygen.

It has been found that the magnesium titanate may be selected from magnesium meta-titanate and ortho-titanate and combinations thereof, but the di-titanate is reducible at the above noted firing conditions and must be excluded to permit the achievement of very high Q values. Likewise, the oxides of lead, bismuth and cadmium must be excluded from the glass because a strong relationship exists between very high capacitor Q values and the absence of reduced material anywhere in the body.

The method for making these capacitors includes mixing powders of a non-reducible magnesium titanate and precursors of a non-reducible glass with an organic binder and subsequently forming layers of the mix. The layers are stacked with a film of copper paste therebetween and fired in an environment of about $10^{-11}$ atmospheres of oxygen at a temperature below 1080° C. Copper melts at 1083° C. Another electrode is applied in contact with the body in spaced relationship with the aforementioned buried film.

DESCRIPTION OF THE PREFERRED EMBODIMENTS

Figures 1, 2:
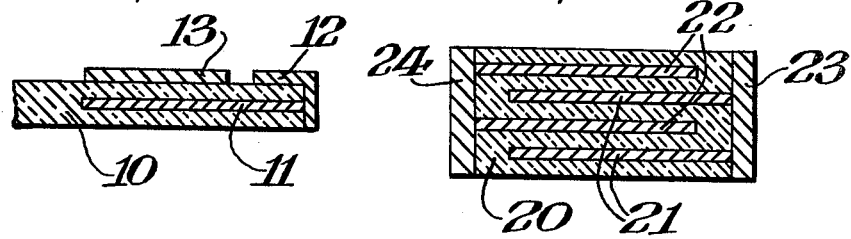
FIG. 1 shows in cross sectional view a monolithic capacitor of this invention having a reduction resistant glass-ceramic body 10, one base-metal electrode 11 buried therein, an external conductive terminal 12 by which external contact is made to the electrode 11, and another electrode 13 in contact with body 10 and in capacitive relationship with buried electrode 11.
FIG. 2 shows in cross sectional view a monolithic capacitor of this invention having a reduction resistant glass-ceramic body 20, a group of base-metal electrodes 21 being buried therein and being in capacitive relationship with another group of buried base-metal electrodes 22. External terminals 23 and 24 are connected to the group 21 and group 22 electrodes, respectively.

A quantity of a ceramic powder, supplied by the Tam Division of N.L. Industries, Niagara Falls, New York and designated TICON MT(C), was mixed with 10 volume percent (true) of a barium alumino borate glass. This commercial ceramic powder contained 84 wt percent magnesium titanate and an alumino silicate amounting to 16 weight percent. X-ray analysis revealed that the magnesium titanate consisted of the ortho-titanate ($Mg_2TiO_4$) and the meta-titanate ($MgTiO_3$) but no di-titanate ($MgTi_2O_5$). The 10 volume percent glass component of the above noted powder mixture was $4BaO.Al_2O_3.2B_2O_3$. Thus the powder mixture contained 74 weight percent magnesium titanate and 26 weight percent of the glass components.

The powder mixture was combined with an organic vehicle and milled for 6 hours in a porcelain mill containing alumina balls. A slurry was formed of the milled material that was subsequently made into layers by a standard doctor blade technique and dried. Two of the layers were stacked having interleaved therebetween a copper paste film to form a capacitor body. Hand screened monolithic capacitors, each with a buried copper electrode, were made having a single active dielectric layer approximately 80 micrometers thick and 10 square millimeters in area after firing. The capacitor bodies and buried electrode were cofired at 1050° C. for 2 hours in a partial oxygen environment of $10^{-11}$ atmospheres of oxygen. The partial oxygen environment was achieved by using a mixture of CO and $CO_2$ as is more fully described in my patent U.S. Pat. No. 3,902,102 issued Aug. 26, 1975 that is assigned to the same assignee as is the present invention. Another electrode was applied to an outer face of the fired body. At 1.0 MHz, the dielectric constant is 10.4±1 and the average Q is 3500. The insulation resistance is $2 \times 10^{12}$ ohms at 25° C. and is $5 \times 10^{11}$ ohms at 125° C.

Another commercial ceramic powder, supplied by N.L. Industries designated Magnesium Titanate A was mixed, as in the above described example, with 10 volume percent of the same barium borate glass. An analysis of the ceramic powder showed that it contained a major proportion of meta-titanate ($MgTiO_3$) and a small proportion of di-titanate ($MgTi_2O_5$). By weight the magnesium titanate is 88.5 percent in this powder mix and the glass precursor components total 11.5 percent.

A slip suspension was made of the powder mixture and an organic binder. The slip was cast in a layer approximately 0.5 millimeter thick and when dry was cut into 10 millimeter square wafers. A paste containing copper powder was applied to opposite wafer surfaces leaving a 2 mm margin. The wafers were then fired at 1050° C. for 2 hours in a partial oxygen environment of $10^{-11}$ atmospheres of oxygen.

At 1.0 MHz the dielectric constant is 25, the Q is 50 and an insulation resistance at 25° C. of $10^{10}$ ohms was measured. The greatly inferior performance of capacitors of the second example is attributed to the inclusion of magnesium di-titanate which is subject to reduction during firing in a partial oxygen atmosphere. Consequently the body was rendered mildly semiconducting depressing both Q and insulation resistance.

Other non-reducible glasses that are suitable for use in capacitors of this invention are described in my patent U.S. Pat. No. 4,101,952 issued July 18, 1978 that is assigned to the same assignee as is the present invention.

The above noted glasses that form the intergranular phase at firing may or may not become a wholly amorphous glass. The term intergranular glass phase employed herein is meant to include a mixture of crystalline and/or amorphous material that contains glass-former elements such as boron and silicon.

The crystalline ceramic phase of capacitors of this invention consists essentially of magnesium titanate but may contain minor quantities of other materials that do not render the crystals semiconducting at firing and thus do not substantially diminish the inherently high Q and high insulation resistance of the meta- and ortho-titanate crystals. For example, the inclusion of up to 10 mole percent, relative to the magnesium, of other alkaline earth metals in the crystalline ceramic phase such as calcium and strontium will effect adjustment of the temperature coefficient of capacitance. In general, it is desirable that the crystalline phase contain at least 85 weight percent of the very high Q magnesium titanate.

In the above examples the alumina and silica are assumed to combine at firing with the intergranular phase because these materials are known to do so when included among various ceramic start materials. This is especially likely at the low firing temperatures that must be employed here, namely below the melting temperature (1083° C.) of the internal copper electrodes. However, small amounts of alumina as well as baria may enter the magnesium titanate crystals without degrading the excellent electrical performance properties of the dielectric body.

What is claimed is:

1. A monolithic ceramic capacitor comprising a non-reducible glass-ceramic body having at room temperature a dielectric constant of about 10 and a Q at 1 MHz of greater than 1000, said body consisting of from 10% to 50% by weight of a non-reducible glass phase and from 50 to 90% by weight of a non-reducible crystalline ceramic phase, said ceramic phase being comprised of at least 85 mole percent magnesium titanate, a copper electrode being buried and cofired in said body and another electrode being in contact with said body and spaced from said buried copper electrode.

2. The monolithic ceramic capacitor of claim 1 wherein said non-reducible ceramic phase is free of $MgTi_2O_5$.

3. The monolithic capacitor of claim 1 wherein said glass phase is an alkaline earth borate.

4. The monolithic capacitor of claim 1 wherein said ceramic phase additionally contains strontium up to 10 mole percent of said magnesium.

5. The monolithic ceramic capacitor of claim 1 wherein said ceramic phase additionally contains calcium up to 10 mole percent of said magnesium.

6. The monolithic ceramic capacitor of claim 1 wherein said non-reducible glass phase is substantially free of lead, bismuth and cadmium.

* * * * *